United States Patent [19]

Aciu et al.

[11] Patent Number: 5,625,412
[45] Date of Patent: Apr. 29, 1997

[54] HIGH-FRAME RATE IMAGE ACQUISITION AND MOTION ANALYSIS SYSTEM

[75] Inventors: Alexandru V. Aciu, Toms River, N.J.; Petru Pop; Radu Corlan, both of Bucharest, Romania

[73] Assignee: Vision Research, Wayne, N.J.

[21] Appl. No.: 502,213

[22] Filed: Jul. 13, 1995

[51] Int. Cl.$^6$ .................................................. H04N 5/228
[52] U.S. Cl. ........................ 348/222; 348/231; 348/283; 348/901; 348/719
[58] Field of Search ........................... 348/222, 231, 348/282, 283, 714, 901, 718, 719; H04N 5/228, 5/76

[56] References Cited

U.S. PATENT DOCUMENTS

| | | | |
|---|---|---|---|
| 5,043,816 | 8/1991 | Nakano | 348/231 |
| 5,295,077 | 3/1994 | Fukuoka | 348/231 |

*Primary Examiner*—Safet Metjahic
*Assistant Examiner*—Sherrie Hsia
*Attorney, Agent, or Firm*—Alfred C. Hill

[57] ABSTRACT

A high-frame rate image acquisition and motion analysis system comprising a first arrangement to obtain an image of an object; a second arrangement coupled to the first arrangement to slice the image into N analog segments, where N is equal to an integer greater than one; a third arrangement coupled to the second arrangement to convert the N analog segments into N digital data streams; a fourth arrangement coupled to the third arrangement to store each of the N digital data streams; a fifth arrangement coupled to the first arrangement, the second arrangement, the third arrangement and the fourth arrangement to provide software control of the operation thereof, the fifth arrangement further controlling the first arrangement and the second arrangement to adjust separately predetermined variables of each of the N analog segments and further controlling the fourth arrangement to provide a read out of an adjusted version of the image; a common enclosure for the first arrangement, the second arrangement, the third arrangement, the fourth arrangement and the fifth arrangement; and a sixth arrangement disposed externally of the enclosure coupled to the fifth arrangement to control the operation of the fifth arrangement and to display the adjusted version of the image present in the fourth arrangement.

20 Claims, 7 Drawing Sheets

HIGH-FRAME RATE IMAGE ACQUISITION AND MOTION ANALYSIS SYSTEM

BACKGROUND OF THE INVENTION

The present invention relates to high-frame rate cameras and more particularly to a high-frame rate compact electronic camera integrated into a compact and fully integrated high-frame rate image acquisition and motion analysis system with a modular and expandable structure.

It is known that there are:on the market high-frame rate cameras having a structure with separate units for each building block, namely, camera head with an image sensor; cables for analog and video output signals; controller-storage unit (electronic memory, magnetic tape memory) on a separate hand truck; local control panel; and standard video monitor with no data reduction and no user selectable image processing. A number of U.S. patents are known relating to video cameras, such as U.S. Pat. Nos. 4,212,034; 4,280,141; 4,322,638; 4,330,796; 4,496,995; 4,694,220; 4,851,914; 4,970,597; 5,157,499; 5,227,888; 5,278,657 and 5,298,734 which deal primarily with various types of CCD (charged-coupled device) cameras which are related to only a small part of the high-frame rate image acquisition and motion analysis system of the present application. U.S. Pat. Nos. 5,172,234; 5,251,036; 5,253,064; 5,301,026; 5,313, 306; 5,331,411; 5,339,105; 5,374,995 and 5,376,963 all teach the processing of output data from an imager on digital basis.

With regard to the above cited patents none of these patents disclose analog processing of the analog output of an imager. Rather, each of the later group of patents teach processing the output signals of the imager on a digital basis, in other words, the analog signal at the output of the imager is converted to a digital signal before processing. In addition, none of these patents disclose a high-frame rate camera with integrated image acquisition and motion analysis software.

SUMMARY OF THE INVENTION

An object of the present invention is to provide an improved high-frame rate image acquisition and motion analysis system with a modular and expandable structure contained in a common enclosure.

Another object of the present invention is to provide a high-frame rate image acquisition and motion analysis system including a camera head having an image sensor with a plurality of parallel analog outputs; parallel analog signal processing; analog to digital converters after the analog processing; software configurable frame buffer electronic memory; image sensor and memory controller; a CPU (central processing unit); storage devices; input and output analog and digital signals; network interface; and software for graphical user interface and for data reduction.

A further object of the present invention is to provide a high-frame rate image acquisition and motion analysis system having a wide range variable frame rate; a wide range electronic exposure time control; frame format adjustment; variable recording time (a function of frame format and rate); memory gate control; a built-in sequencer; post- and pre-trigger image memory control; built-in graphical user interface; built-in file management; built-in data reduction software for fast data reduction of stored images; built-in image compression/decompression software; and remote control and operation through a computer network.

Still another object of the present invention is to provide a high speed image acquisition and motion analysis system capable of integrating the high speed image synchronized with external analog and digital signals, image playback, image processing and motion analysis in one, compact and rugged package or enclosure.

Still a further object of the present invention is to provide an image acquisition and motion analysis system as described above contained in a rugged compact enclosure that can be held in one hand.

A feature of the present invention is the provision of a high-frame rate image acquisition and motion analysis system comprising: first means to obtain an image of an object; second means coupled to the first means to slice the image into N analog segments, where N is equal to an integer greater than one; third means coupled to the second means to convert the N analog segments into N digital data streams; fourth means coupled to the third means to store each of the N digital data streams; fifth means coupled to the first means, the second means, the third means and the fourth means to provide software control of the operation thereof, the fifth means further controlling the first means and the second means to adjust separately predetermined variables of each of the N analog segments and further controlling the fourth means to provide a read out of an adjusted version of the image; and sixth means coupled to the fifth means to control operation of the fifth means and to display the adjusted version of the image present in the fourth means.

Another feature of the present invention is the provision of a common rugged enclosure for the above mentioned first means, the second means, the third means, the fourth means and the fifth means with the sixth means being disposed externally of the enclosure coupled to the fifth means to control the operation of the fifth means and to display the adjusted version of the image present in the fourth means.

Still another feature of the present invention is to provide as the fifth means a personal computer unit having a program with a graphical user interface installed therein which controls the various means in the enclosure in response to a selected one of a keyboard, a mouse, a trackball, a network and analog or digital data and a selected combination of a keyboard, a mouse, a trackball, a network and analog or digital data.

Still a further object of the present invention is the provision of a high-frame rate image acquisition and motion analysis system containing all of the above mentioned first, second, third, fourth and fifth means in a common enclosure with these means being provided on a single circuit board or a plurality of circuit boards such that the common enclosure is small enough to be hand held.

BRIEF DESCRIPTION OF THE DRAWING

Above-mentioned and other features and objects of the present invention will become more apparent by reference to the following description taken in conjunction with the accompanying drawing, in which.

DESCRIPTION OF THE PREFERRED EMBODIMENT

Figure 1:
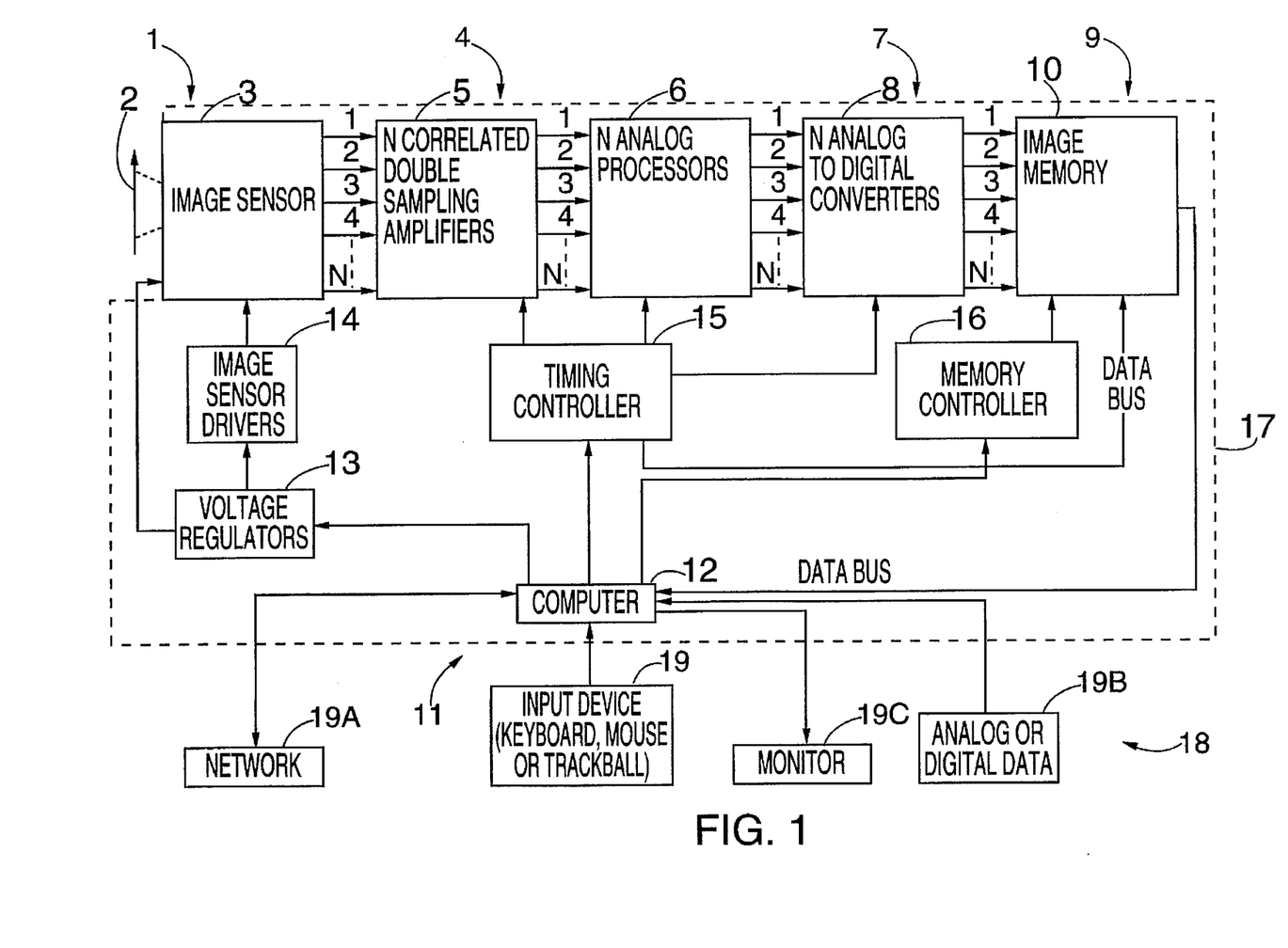
FIG. 1 is a block diagram illustrating the high-frame rate image acquisition and motion analysis system in accordance with the principles of the present invention.

Referring to FIG. 1, the high-frame rate image acquisition and motion analysis system in accordance with the principles of the present invention is a compact and fully integrated, high-frame-rate and high-resolution image acquisition and motion analysis system. The system of FIG. 1 integrates high-speed image acquisition, image storage, image playback, image processing and motion analysis features. The image acquisition and motion analysis system as shown in FIG. 1 includes a first means 1 to obtain an image of an object 2 and is an image sensor 3 having read-out structures to maximize speed and reduced noise, improve imager resolution through cross talk reduction and increased fill-factor, and maximized dynamic range and anti-bloom performance. As an example, image sensor 3 may be a charged coupled device (CCD) image sensor which will be described herein as using a 512×512 imager. However, it is to be clearly understood that this is not a limiting factor, but rather the image sensor 3 can be expanded to be a 1024×1024 pixel imaging system, or any other expanded pixel imaging system. It should also be appreciated that a CCD image sensor is not the only image sensor that can be used. The system of the present invention may employ any type of image sensor.

The image acquisition and motion analysis system of the present invention as shown in FIG. 1 includes a second means 4 coupled to the output of image sensor 3 to slice the image output from image sensor 3 into N analog segments, where N is equal to an integer greater than one. As an example, N equals 16 as employed herein.

As shown in FIG. 1, the second means 4, as an example, includes N correlated double-sampling amplifiers 5 and N analog processors 6.

As shown in FIG. 1, the system of the present invention further includes a third means 7 in the form of N analog to digital converters 8 to convert the N analog segments into N digital data streams. The N digital data streams at the output of converters 8 are coupled to a fourth means 9 in the form of image memory 10 to store each of the N digital data streams therein for readout of the adjusted image and to be connected to a fifth means 11 in the form of computer 12 having a graphical user interface software program therein, for example, Windows or other similar programs. The software program in computer 12, which is a known and standard computer with a known and standard program, controls first means 1, second means 4, third means 7 and fourth means 9 through the voltage regulators 13, the image sensor drivers 14, timing controllers 15 and memory controller 16 to control the operation of these components and to further control the first means 1 and the second means 4 to adjust separately in each of the N analog segments predetermined variables and to further control the fourth means 9 to provide a read out of the adjusted version of the image.

All of the means 1, 4, 7, and 9 as well as computer 12 are enclosed in a common, rugged, compact enclosure 17 which is small enough to be hand held which is accomplished by employing integrated and printed circuit boards for the various components of the various means mentioned hereinabove.

A sixth means 18 includes a selected one of an input device 19, such as a keyboard, mouse or trackball, network 19A and analog or digital data 19B or any combination of these control elements to enable the user of the image acquisition and motion analysis system of the present invention to control the frame rate, pixel rate, integration time, number of post-trigger frames, trigger modes, trigger delays and image size, direct current offset removal, contrast control and brightness control.

The adjusted version of the image is provided at the output of computer 12 and displayed in monitor 19C.

Figures 2, 9:
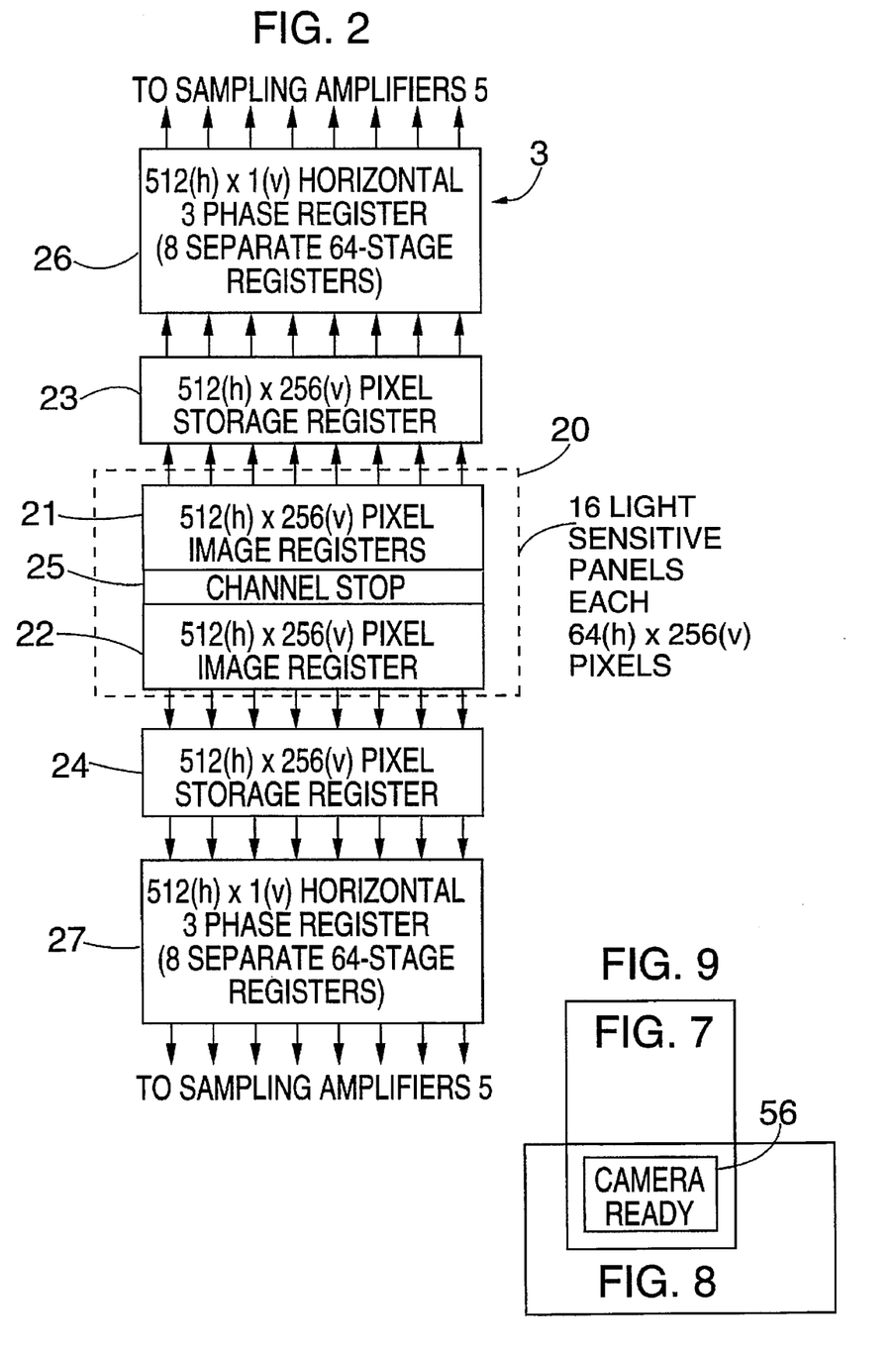
FIG. 2 is a block diagram of one example of the image sensor of FIG. 1 in accordance with the principles of the present invention.

Referring to FIG. 2, an example of an image sensor 3 that can be employed in the present image acquisition and motion analysis system, in the form of a charge coupled device (CCD), is illustrated in block diagram form. The CCD imager or image sensor 3 is designed for back illumination to achieve a fill factor as close to 100 percent as possible. Back illumination results in a more uniform response over the pixel area and a higher quantum efficiency. The basic structure of the image of FIG. 2 includes N light sensitive panels or wafers 20 each having Y×Z pixels. In the example illustrated N equals 16, Y equals 64 and Z equals 256. The light sensitive panels or wafers 20, for example, can be produced by silicon wafers being thinned to approximately 10 micrometers and undergoing a back surface treatment to minimize signal loss near the back surface. After wafer thinning the silicon wafers are laminated to a 400 micrometer transparent glass substrate for mechanical support. The chip size for a 512×512 imager can be 1.1×2.0 centimeters square. The devices are mounted in blackened packages with standard 0.1 inch pin spacing and may interface external circuitry via commercially available zero-insertion-force sockets.

The structure of the image sensor 3, as shown in FIG. 2, employs a split-frame, frame-transfer readout arrangement that increases the frame rate and decreases the image transfer time from image registers 21 and 22 to shielded storage registers 23 and 24. The imaging area 20 is partitioned into two image registers 21 and 22, separated by a horizontal two micrometers wide channel stop 25 placed at the center of the image format. The imaging area consists of two 512 (x)×256 (v) pixels sub-arrays. Adjacent to each register 21 and 22 is a 512 (h)×256 (v) pixels storage registers 23 and 24. The outermost ten rows of each imaging sub-array are used for alignment tolerances of the opaque metal mask that shields the registers 23 and 24. This guarantees that light does not generate photoelectrons in the storage registers 23 and 24. In normal operation, the first ten lines are discarded after image transfer from registers 21 and 22 to registers 23 and 24. The registers 21 and 22 and registers 23 and 24 are composed of three-phase, three level polysilicon gate structures. A total of 48 bonding pads are used for vertical clock-driver connections to the three-phase polysilicon gates of the imagers. Double-sized pads are combined with double-wire bonding leads to reduce the effects of lead inductance.

At the output of registers 23 and 24 are two 512 (h)×1 (v) horizontal registers 26 and 27. Each three-phase registers 26 and 27 is divided into eight separate 64-stage registers, operating simultaneously, which receive in parallel the signal charge from the associated registers 23 and 24. The signal charge is transferred serially by each 64-stage registers of registers 26 and 27 to a floating-diffusion sense node where it is voltage-coupled to an on-chip, three-stage correlated-double-sampling (CDS) amplifier 5 as shown in FIG. 1, for example. An additional two-stage section is added to each 64-stage registers of registers 26 and 27 to aid the transfer of signal charge from the main section of registers 26 and 27 to the floating diffusion sense nodes, giving a total of 66 pixel clock cycles needed to read out one video line.

Figure 3:
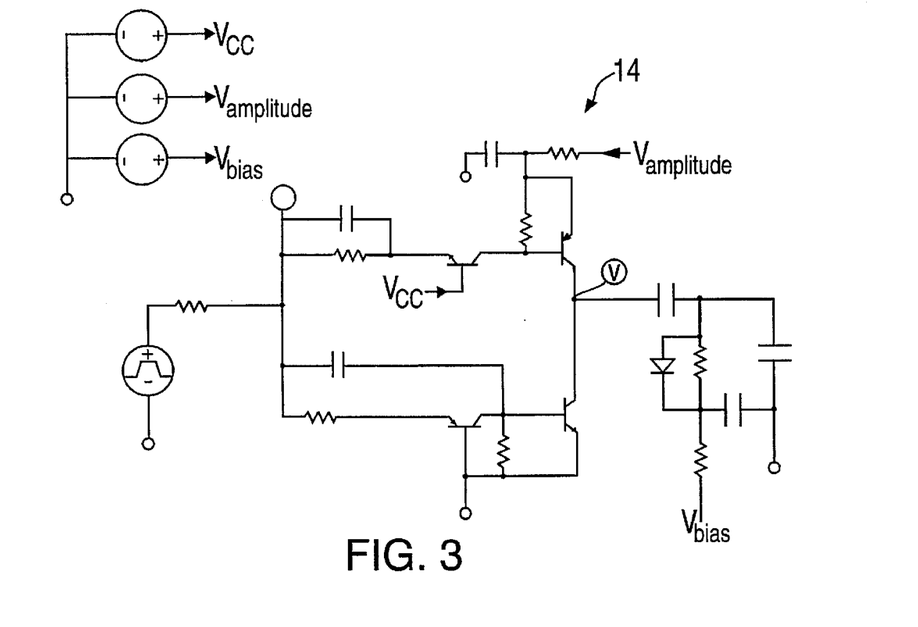
FIG. 3 is a schematic diagram of one example of the image sensor drivers of FIG. 1 in accordance with the principles of the present invention.

The image sensor 3 is controlled by the image sensor drivers 14 with a simplified circuit diagram thereof being illustrated in FIG. 3. The driver 14 include eighteen CDS drive circuits contained on a 4 inch by 6 inch circuit board configuration to minimize lead length and coupling with the sixteen analog output lines. Drive signal amplitudes are controlled via the software-controlled digital to analog converters contained therein. Commercially available MOS drivers are used to drive the relatively high capacitance of vertical CDS gates. A custom-design driver is used for the high-speed serial shift register and CDS gates. The simplified schematic of the horizontal drive circuit shown in FIG. 3 is optimized for the low capacitance of the horizontal shift and CDS gates and provides stable control of the post transition edges. Signal amplitudes and bias levels are adjusted via the Vbias and Vamplitude connections shown in the FIG. 3. The CDS bias voltages can be controlled in real time via system software contained in computer 12 while the live image and histograms are displayed.

Figure 4:
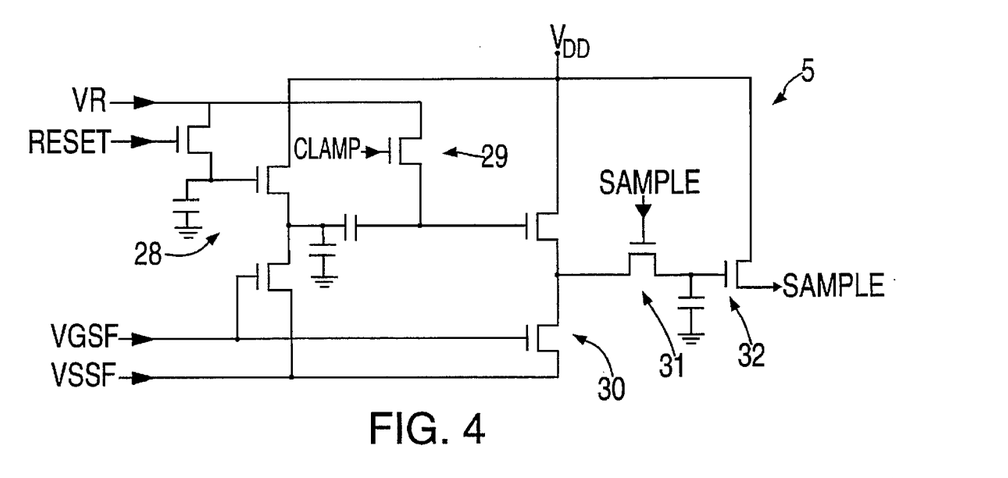
FIG. 4 is a schematic diagram of one example of the correlated double-sampling amplifiers of FIG. 1 in accordance with the principles of the present invention.

The sixteen CDS amplifiers 5 are required for the 512× 512 imager 3 when N is equal to sixteen, in the example employed herein. The use of on-chip CDS amplifiers reduces the number of off-chip components and size of the circuit board. The CDS amplifiers are designed for 20 Mhz (megahertz) operation, one of which is illustrated in FIG. 4. Each of the amplifiers 5 include a first-stage having a source follower 28 and a synchronous clamp 29, a second-stage having a source follower 30 and sample and hold circuit 31 and a third-stage having a source follower 32. During video readout, the pixel reset signal rises the potential of the sense mode to the reset level VR and empties the sense node of charge in preparation for the next discreet pixel charge packet. A slightly delayed version of the reset signal is applied to the synchronous clamp 29, holding the potential of the first source follower 28 and the second source follower 30 to reset potential VR. The clamping signal remains high after the reset signal is switched low to hold the input gate potential of the second-stage at the clamping potential VR until the reset switching noise has settled. Immediately after the clamp signal is Switched low, the video signal charge is transferred from serial phase floating-diffusion sense node, where it is voltage coupled to the CDS amplifier. This modulation of the sense node results in an alternating current signal at the input of the second-stage. Following the signal charge transfer, the sample and hold control signal switches to a high level and is held until the video signal is settled at the input of the third-stage 32. The sample-and-hold control signal is then switched low to hold the video signal at the input of the third-stage source follower 32 until the next video signal arrives. A more detailed description of the CDS circuit operation can be found in the article by Sauer et al entitled, "High Fill-Factor CCD Imager With High Frame-Rate Readout", Proceeds SPIE 12/91: *Optical and Digital GA a As Technologies for Signal-Processing Applications*, pages 174–184, 1990.

Columns in the imaging registers 21–24, 26 and 27 are separated by fixed-barrier, lateral anti-blooming drain structures. The fixed anti-bloom barrier establishes a maximum charge capacity for each imaging pixel. During signal integration, excess charge beyond the full-well levels spills preferentially into the anti-bloom drain and leaves the device via external contacts rather than spreading up and down the CCD buried channel. Blooming suppression has been measured experimentally at exposure levels over 1,000 times the full-well capacity. The barrier implant dose yields a measured full well capacity of about 450,000 electrons, attained with 14 to 15 volt vertical drive signals.

The image acquisition and motion analysis system of the present invention is designed to exercise the capabilities of the CCD imaging chips and allow flexibility to meet different imaging requirements. The design enables real-time software control of CCD bias voltages as provided by voltage regulator 13, drive clock amplitudes as provided by drivers 14, and drive clock timing. These controls permit optimization of imager operation for specific applications as well as fine calibration of individual imaging devices.

The timing controller 15 and the memory controller 16 which controls the input and output of the system are produced with reconfigurable gate arrays under control of the internal host computer 12. Among the features controlled are frame rate, the pixel rate, integration time, number of post-trigger frames, trigger modes, trigger delays and image size.

Figure 5:
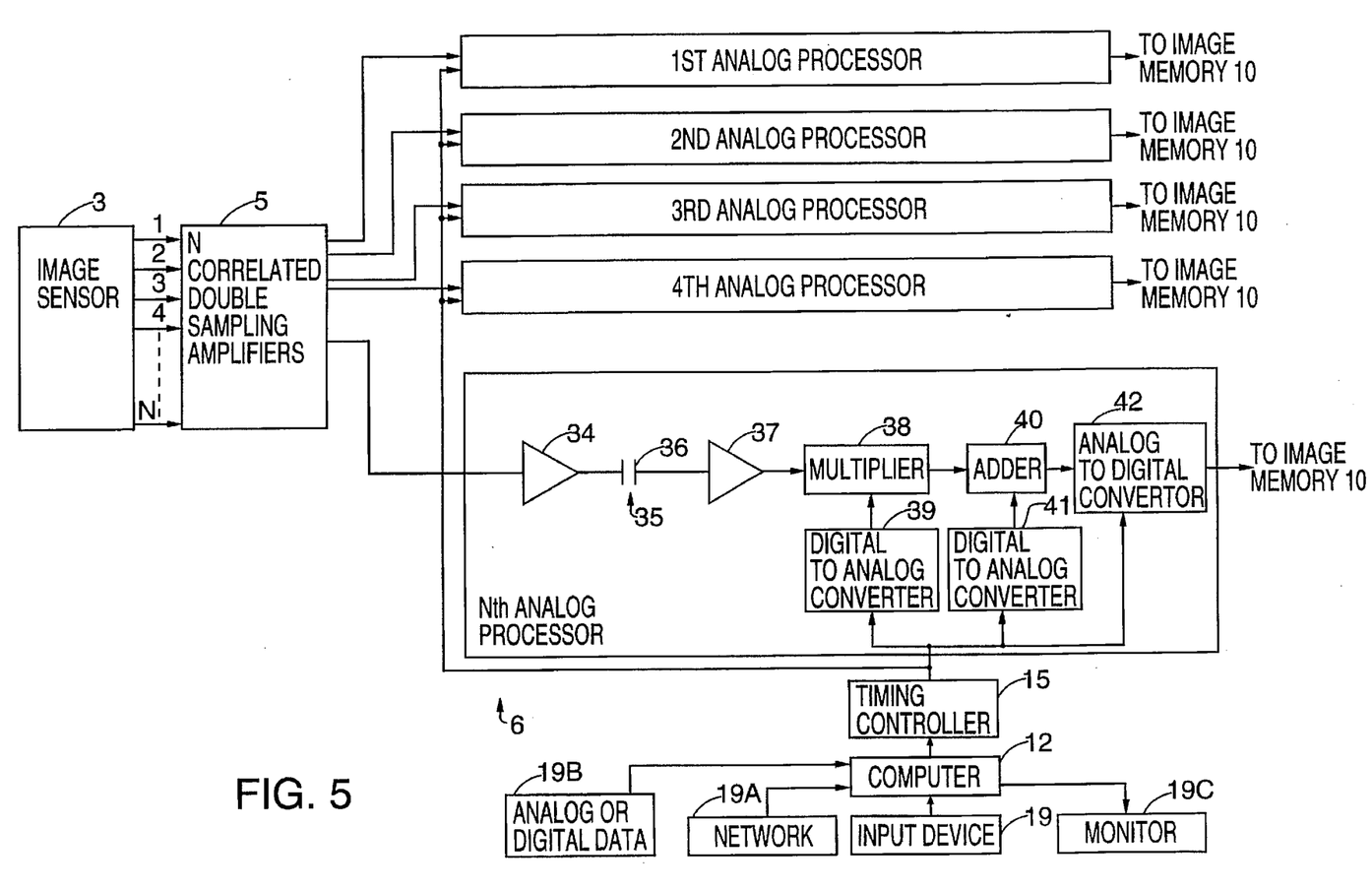
FIG. 5 is a block diagram of one example of the analog processors of FIG. 1 including a more detailed illustration of the circuitry of each of the N analog processors.

Referring to FIG. 5, one example of the N analog processors 6 are illustrated with one of the processors being shown in detail in block diagram form. Each of the N analog processors 6 include a buffer amplifier 34 coupled to a circuit 35 including capacitor 36 and amplifier 37 for direct current (DC) offset removal. Contrast adjustment is provided by multiplier 38 coupled to the output of amplifier 37 and the output of digital to analog converter 39 which receives an input from timing controller 15 and computer 12 to adjust the contrast in response to a command from input device 19, network 19A and analog or digital data 19B. The output of multiplier 38 is coupled to an adder 40 which responds to a command from timing controller 15 after it is converted to an analog signal by digital to analog converter 41. The adder 40 enables a brightness adjustment upon command from the computer 12. The analog to digital converter 42 is coupled to the output of adder 40 to provide a signal in digital form to the image memory 10.

The image memory 10 is a circular buffer memory which records continuously up to the limit of the buffer. The recorded cine is synchronized with an event-generated, manually generated or internal trigger. Also, the recording process can be interrupted by an external asynchronous memory gate signal. The memory contents can be permanently saved by the internal host computer 12 automatically or manually.

Figure 6:
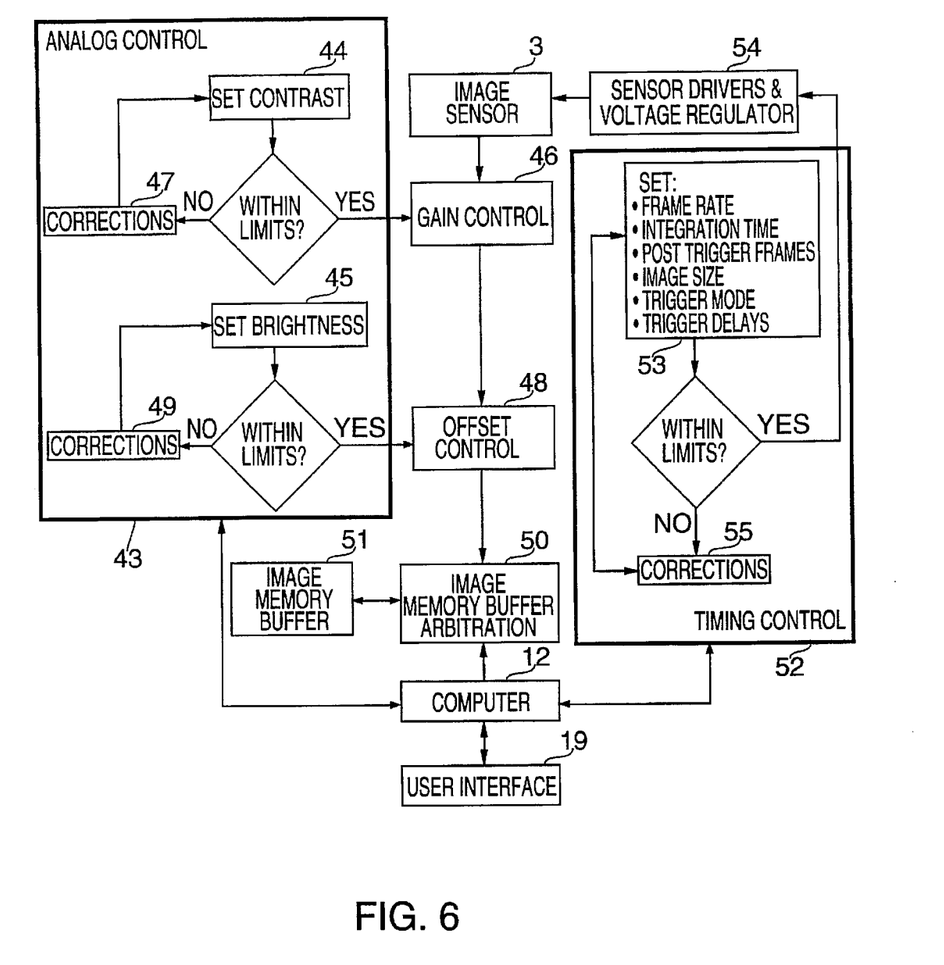
FIG. 6 is a flow chart illustrating the data flow control of the high-frame rate image acquisition and motion analysis system of FIG. 1 in accordance with the principles of the present invention.

Referring to FIG. 6, there is illustrated therein a data flow control chart that illustrates that the analog control and timing control is controlled by the software of computer 12 under commands from the user interface or input device 19, which may use a keyboard or mouse or trackball, network 19A or analog or digital data 19B, or any combination of these user interfaces. Analog control 43 receives instructions from computer 12 to set the contrast 44 and the brightness 45. If the set contrast 44 is within limits the gain control 46 is accomplished in amplifiers 5. If the contrast control is not within limits then corrections are made at 47. When attempting to set the brightness 45, if the controls are within limits the offset control 48 is accomplished in the analog processors. If the control for brightness is not within limits then corrections 49 are made until within the limits. The flow of the signals from gain control 46 received from sensor 3, will be passed to the offset control 48 to the image memory buffer arbitration 50 and, hence, to the image memory buffer 51, all under control of computer 12. As shown further in FIG. 6, the timing control 52 is accomplished by means of commands from the computer 12 under control of the user interface 19, network 19A or analog or digital data 19B. If the frame rate, integration time, post trigger frames, image size, trigger mode and/or trigger delays are all set properly within limits the sensor driver and voltage regulator outputs are supplied to the sensor 3 through block 54. If the frame rate, integration time, post trigger frames, image size, trigger mode and/or trigger delays in block 53 are not within limits then the corrections are made in block 55 until the various variables of block 53 are within the desired limits.

Figure 7:
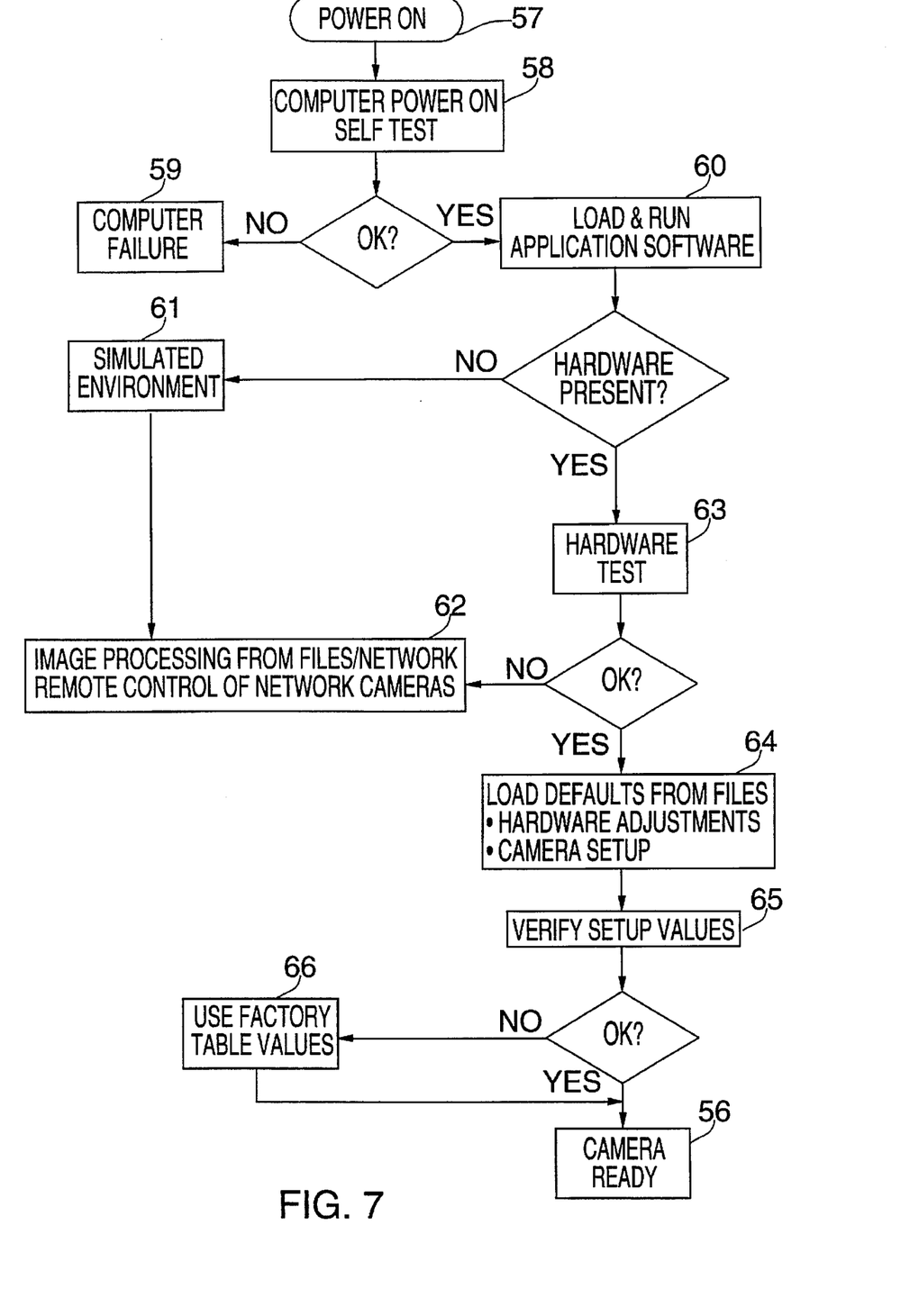
FIGS. 7 and 8, organized as shown in FIG. 9, is a flow chart illustrating the start up sequence of the high-frame rate image acquisition and motion analysis system of FIG. 1 in accordance with the principles of the present invention.
Figure 8:
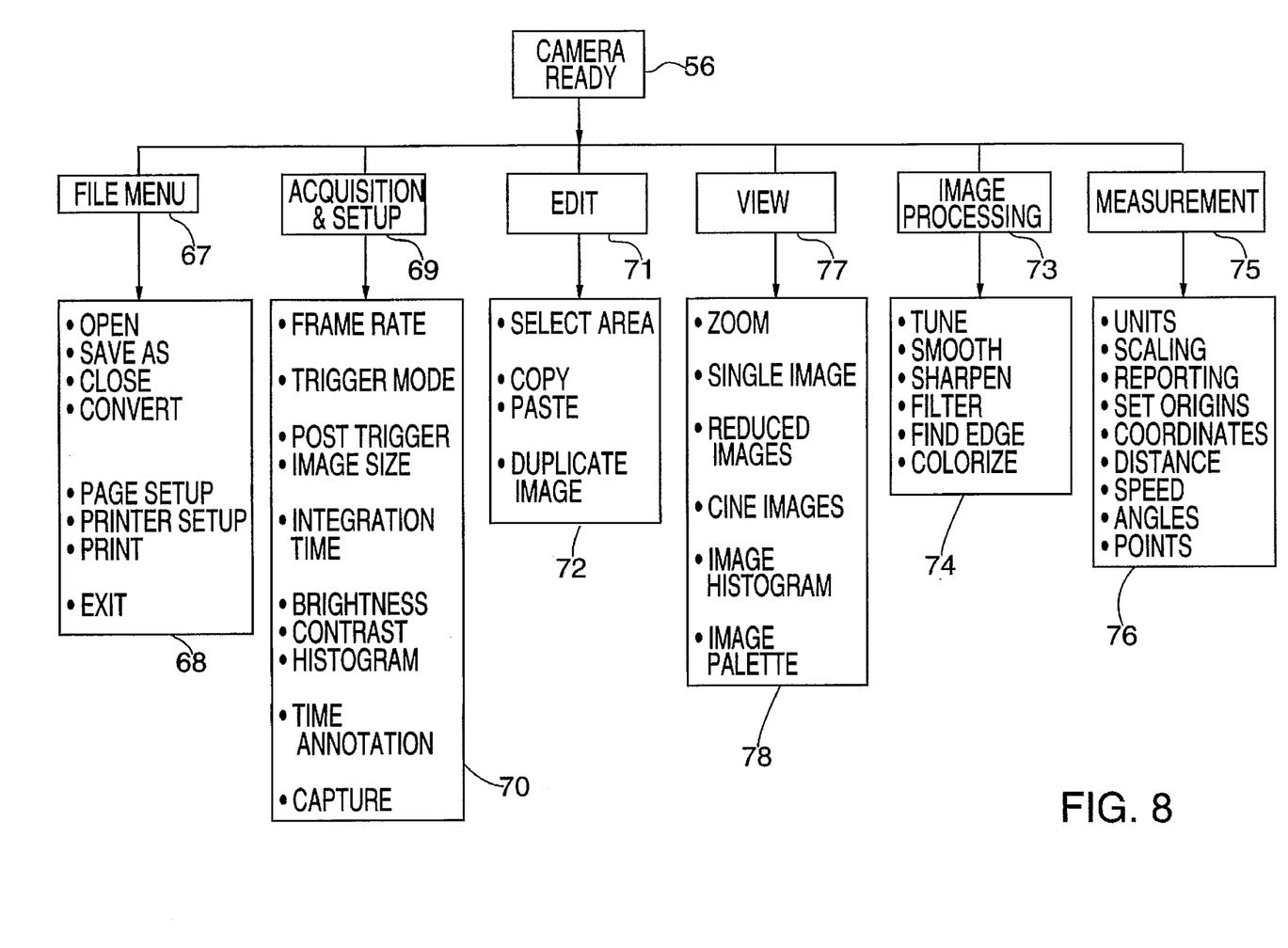

Referring to FIGS. 7 and 8, when organized as shown in FIG. 9 with camera ready blocks 56 being placed one upon the other, provides a flow chart of the start up sequence. When the power 57 is first switched on the computer is on self test as shown at 58. If the self test at 58 is not okay there is a computer failure as shown in block 59. If the computer test is okay, the load and run application software is placed in operation as shown at 60. The next test is whether the hardware is present. If the hardware is not present, a simulated environment 61 is initiated so that the output therefrom is coupled to image processing from files/network remote control of network camera at 62. This will not come into play unless the hardware test at 63 is found to be no good. The hardware test comes into existence if the hardware is present. If the hardware test is okay, the defaults of the files are loaded with hardware adjustment and camera set up as shown at 64. If everything is okay, there is a verification of the set up values at 65 and if everything is okay, the camera 56 is made ready. If the set up values are not okay, you would then go to block 66 and use factory table values. When the camera is ready as shown in block 56 the computer is ready to go into operation to respond to commands from the user with the various software programs being placed at the command of the user as shown in the various blocks in FIG. 8, all of which are self explanatory. Each of the blocks of FIG. 8 illustrate various components capable of being controlled by the user from the computer 12 through the program present in the computer 12, as mentioned hereinabove.

It is shown in FIG. 8, the program includes a file menu 67 which enables the selection of the commands as shown in block 68. There is also an acquisition and setup portion of the program as shown in block 69 which enables the selections shown in block 70. There is also an edit portion of the program as shown in block 71 which enables making the selections as shown in block 72. The image processing portion of the program as shown in block 73 which enables tuning, smoothing, sharpening, filtering, fine edge and colorize as shown in block 74. The portion of the program shown in block 75 is an image analysis measurement portion of the program that enables accomplishing what is shown in block 76. The computer program has a viewing control as shown in block 77 which enable control of the viewed image as indicated in block 78.

While we have described above the principles of our invention, in connection with specific apparatus, it is to be clearly understood that this description is made only by way of example and not as a limitation to the scope of our invention as set forth in the objects thereof and in the accompanying claims.

We claim:

1. A high-frame rate image acquisition and motion analysis system comprising:

first means to obtain an image of an object;

second means coupled to said first means to slice said image into N analog segments, where N is equal to an integer greater than one;

third means coupled to said second means to convert said N analog segments into N digital data streams;

fourth means coupled to said third means to store each of said N digital data streams;

fifth means coupled to said first means, said second means, said third means and said fourth means to provide software control of the operation thereof, said fifth means further controlling said first means and said second means to adjust separately predetermined variables of each of said N analog segments and further controlling said fourth means to provide a read out of an adjusted version of said image;

a common enclosure for said first means, said second means, said third means, said fourth means and said fifth means; and sixth means disposed externally of said enclosure coupled to said fifth means to control the operation of said fifth means and to display said adjusted version of said image present in said fourth means.

2. A system according to claim 1, wherein said first means includes
a charge-coupled device image sensor.

3. A system according to claim 2, wherein said image sensor includes

N light sensitive panels each having (Y)×(Z) pixels, where Y and Z are each equal to an integer greater than one;

a pair of image registers included as part of said N light sensitive panels each having (Y)×(Z) pixels;

a pair of storage registers each coupled to a different one of said pair of image registers, each of said pair of storage registers having (Y)×(Z) pixels; and a pair of three phase registers each coupled to a different one of said pair of storage registers and said second means, each of said pair of three phase registers having (Y)×1 pixels.

4. A system according to claim 3, wherein said second means includes

N correlated double-sampling amplifiers coupled to each of said pair of three phase registers to provide said N analog segments and responsive to certain signals from said fifth means to adjust at least one of said predetermined variables in each of said correlated double-sampling amplifiers independent of each other; and N analog processors each coupled to a different one of said N correlated double-sampling amplifiers responsive to other signals from said fifth means to adjust others of said predetermined variables in each of said N analog processors independent of each other.

5. A system according to claim 4, wherein said at least one of said predetermined variables include contrast; and said others of said predetermined variables include direct current offset removal, contrast control and brightness control.

6. A system according to claim 5, wherein
said N analog processors each include
   a buffer amplifier coupled to an associated one of said N correlated double sampling amplifiers;
   a capacitor coupled to an output of said buffer amplifier;
   an amplifier coupled to said capacitor for the direct current offset removal;
   a multiplier coupled to an output of said amplifier and said fifth means to enable the contrast control; and
   an adder coupled to an output of said multiplier and said fifth means to enable the brightness control.

7. A system according to claim 6, wherein
said third means includes
   N analog to digital converters each coupled to a different one of said adders.

8. A system according to claim 7, wherein
said fourth means includes
   an image memory coupled to said fifth means and each of said N analog to digital converters to store each of said N digital data streams therein and to provide said read out of said adjusted version of said image in response to a command from said fifth means.

9. A system according to claim 8, wherein
said fifth means includes
   a computer having a predetermined program to enable control of said image sensor, said N correlated double-sampling amplifiers, said N analog processors, said N analog to digital converters and said image memory in response to commands from said sixth means.

10. A system according to claim 9, wherein
said computer provides control of said image sensor on command from said sixth means of at least frame rate, pixel rate, integration time, number of post-trigger frames, trigger modes brightness, contrast and image size.

11. A system according to claim 10, wherein
said sixth means includes
   a selected one of a keyboard, a mouse, a trackball, a network, analog data, digital data and a selected combination of said keyboard, said mouse said trackball, said network, said analog data and said digital data coupled to said fifth means; and
   a monitor coupled to said fifth means.

12. A system according to claim 1, wherein
said second means includes
   N correlated double-sampling amplifiers coupled to said first means to provide said N analog segments and responsive to certain signals from said fifth means to adjust at least one of said predetermined variables in each of said correlated double-sampling amplifiers independent of each other; and
   N analog processors each coupled to a different one of said N correlated double-sampling amplifiers responsive to other signals from said fifth means to adjust others of said predetermined variables in each of said N analog processors independent of each other.

13. A system according to claim 12, wherein
said third means includes
   N analog to digital converters each coupled to a different one of said N analog processors responsive to a different one of said N analog segments to provide said N digital data streams.

14. A system according to claim 13, wherein
said fourth means includes
   an image memory coupled to said fifth means and each of said N analog to digital converters to store each of said N digital data streams therein and to provide said read out of said adjusted version of said image in response to a command from said fifth means.

15. A system according to claim 14, wherein
said fifth means includes
   a computer having a predetermined program to enable control of said first means, said second means, said third means and said fourth means in response to commands from said sixth means.

16. A system according to claim 15, wherein
said sixth means includes
   a selected one of a keyboard, a mouse, a trackball, a network, analog data, digital data and a selected combination of said keyboard, said mouse, said trackball, said network, said analog data and said digital data coupled to said fifth means; and
   a monitor coupled to said fifth means.

17. A system according to claim 1, wherein
said fourth means includes
   an image memory coupled to said fifth means and said third means to store each of said N digital data streams therein and to provide said read out of said adjusted version of said image in response to a command from said fifth means.

18. A system according to claim 1, wherein
said fifth means includes
   a computer having a predetermined program to enable control of said first means, said second means, said third means and said fourth means in response to commands from said sixth means.

19. A system according to claim 1, wherein
said sixth means includes
   a selected one of a keyboard, a mouse, a trackball, a network, analog data, digital data and a selected combination of said keyboard, said mouse, said trackball, said network, said analog data and said digital data coupled to said fifth means; and
   a monitor coupled to said fifth means.

20. A high-frame rate image acquisition and motion analysis system comprising:
   first means to obtain an image of an object;
   second means coupled to said first means to slice said image into N analog segments, where N is equal to an integer greater than one;
   third means coupled to said second means to convert said N analog segments into N digital data streams;
   fourth means coupled to said third means to store each of said N digital data streams;
   fifth means coupled to said first means, said second means, said third means and said fourth means to provide software control of the operation thereof, said fifth means further controlling said first means and said second means to adjust separately predetermined variables of each of said N analog segments and further controlling said fourth means to provide a readout of an adjusted version of said image; and
   sixth means coupled to said fifth means to control operation of said fifth means and to display said adjusted version of said image present in said fourth means.

* * * * *